United States Patent
Schaeuble et al.

(10) Patent No.: US 12,523,285 B2
(45) Date of Patent: Jan. 13, 2026

(54) WIPER MOTOR, METHOD FOR ASSEMBLING A WIPER MOTOR, AND ASSEMBLY TOOL

(71) Applicant: Valeo Systèmes d'Essuyage, Le Mesnil Saint Denis (FR)

(72) Inventors: Michael Schaeuble, Bietigheim-Bissingen (DE); Harald Kapitza, Bietigheim-Bissingen (DE)

(73) Assignee: Valeo Systemes d'Essuyage, La Verriere (FR)

( * ) Notice: Subject to any disclaimer, the term of this patent is extended or adjusted under 35 U.S.C. 154(b) by 245 days.

(21) Appl. No.: 18/273,119

(22) PCT Filed: Jan. 13, 2022

(86) PCT No.: PCT/EP2022/050597
§ 371 (c)(1),
(2) Date: Jul. 19, 2023

(87) PCT Pub. No.: WO2022/157058
PCT Pub. Date: Jul. 28, 2022

(65) Prior Publication Data
US 2024/0084887 A1    Mar. 14, 2024

(30) Foreign Application Priority Data
Jan. 19, 2021   (DE) ............... 10 2021 101 014.4

(51) Int. Cl.
*F16H 57/031* (2012.01)
*B60S 1/08* (2006.01)
(Continued)

(52) U.S. Cl.
CPC ............. *F16H 57/031* (2013.01); *B60S 1/08* (2013.01); *B60S 1/26* (2013.01); *E05C 3/14* (2013.01);
(Continued)

(58) Field of Classification Search
CPC ................ F16H 57/031; F16H 57/032; F16H 2057/0062; F16H 2057/02034;
(Continued)

(56) References Cited

U.S. PATENT DOCUMENTS

| | | |
|---|---|---|
| 6,163,096 A | 12/2000 | Michenfelder et al. |
| 8,627,745 B2 | 1/2014 | Uchimura |
| 2019/0186596 A1 | 6/2019 | Sugiyama et al. |

FOREIGN PATENT DOCUMENTS

| | | | |
|---|---|---|---|
| CN | 210957990 U | 7/2020 | |
| EP | 2037153 B1 * | 2/2013 | ........... F16H 57/031 |
| JP | 2010045954 A | 2/2010 | |
| JP | 2010045955 A * | 2/2010 | ............ E05F 15/697 |
| JP | 2017-055546 A | 3/2017 | |

(Continued)

OTHER PUBLICATIONS

Machine translation of EP 2037153 obtained from FIT database (Year: 2013).*

(Continued)

*Primary Examiner* — Thomas C Diaz
(74) *Attorney, Agent, or Firm* — Valeo Systemes d'Essuyage

(57) ABSTRACT

The invention relates to a wiper motor (10; 10*a*), having a gearbox housing (12) which preferably has a pot-shaped main body (16) for configuring a receptacle space (18) for a gearbox (20), wherein an opening (21) of the main body (16) is able to be closed by a gearbox cover (22; 22*a*), wherein a plurality of latching connections (26) that act in the direction of a joining direction (24) between the main body (16) and the gearbox cover (22; 22*a*) are configured between the main body (16) and the gearbox cover (22; 22*a*), said latching connections (26) having in each case an elastically deformable first latching element (28; 28*a*) on the gearbox cover (22; 22*a*) and a rigidly configured second latching (Continued)

element (30) that on the main body (16) interacts in a form-fitting manner with the first latching element (28; 28a).

9 Claims, 3 Drawing Sheets

(51) Int. Cl.
 B60S 1/26 (2006.01)
 E05C 3/14 (2006.01)
 F16H 57/032 (2012.01)
 H02K 7/116 (2006.01)
 F16H 57/00 (2012.01)
 F16H 57/02 (2012.01)
(52) U.S. Cl.
 CPC ......... *F16H 57/032* (2013.01); *H02K 7/1166* (2013.01); *F16H 2057/0062* (2013.01); *F16H 2057/02034* (2013.01); *F16H 2057/02082* (2013.01)
(58) Field of Classification Search
 CPC .... F16H 2057/02082; B60S 1/08; B60S 1/26; B60S 1/166; E05C 3/14; H02K 7/1166; H02K 5/04; H02K 7/116; H02K 15/14
 See application file for complete search history.

(56) References Cited

FOREIGN PATENT DOCUMENTS

| JP | 2017073846 A | 4/2017 |
| JP | 2018042345 A | 3/2018 |
| JP | 2020092477 A | 6/2020 |
| WO | 2017018081 A1 | 2/2017 |
| WO | WO-2020186172 A1 * | 9/2020 |

OTHER PUBLICATIONS

International Search Report and Written Opinion in corresponding International Application No. PCT/EP2022/050597, dated Apr. 12, 2022 (13 pages).
European Patent Office, Search Report (with English translation) of corresponding Japanese Application No. 2023-543234, dated Jul. 10, 2024.
European Patent Office, Office Action (with English translation) of corresponding Japanese Application No. 2023-543234, dated Aug. 2, 2024.
European Patent Office, Written Opinion (with English translation) of corresponding Japanese Application No. 2023-543234, dated Aug. 29, 2024.

* cited by examiner

WIPER MOTOR, METHOD FOR ASSEMBLING A WIPER MOTOR, AND ASSEMBLY TOOL

TECHNICAL FIELD

The invention relates to a wiper motor such as serves in particular as a component part of a wiping installation for cleaning a vehicle glass. The invention furthermore relates to a method for assembling a wiper motor of this type, as well as to an assembly tool for carrying out the assembling.

PRIOR ART

A wiper motor having the features in the preamble of claim 1 is known from practical use. The known wiper motor is distinguished by a gearbox housing which is composed of an in particular pot-shaped main body for receiving a gearbox and a gearbox cover that closes the opening of the main body. The fastening or closing, respectively, of the main body by means of the gearbox cover is performed by way of a plurality of latching connections which have in each case an elastically deformable first latching element on the gearbox cover and a rigidly configured second latching element that on the main body interacts in a form-fitting manner with the first latching element. In order for the latching connection to be configured, the first latching element by way of a blocking portion which is disposed in the region of a tongue-type portion and has a blocking face interacts with the second latching element. It is essential here that the (tongue-type) first latching element in a direction running perpendicular to the longitudinal extent thereof, or perpendicular to the joining direction, respectively, has an undercut. This is disadvantageous to the extent that a mould for configuring the gearbox cover having first latching elements integrally moulded thereon must be composed of a plurality of mould parts or slides, respectively, that are disposed so as to be movable relative to one another in order to enable demoulding of the gearbox cover in the region of the first latching elements. In an automated assembling process between the gearbox cover and the main body of the gearbox housing it is furthermore necessary for the first latching elements upon joining of the gearbox cover to the main body to be impinged with a force running perpendicular to the original joining direction so as to ensure that the first latching elements and the second latching elements are actually disposed in an operative connection. An assembly tool for the completely automated assembling of the gearbox housing is therefore of a relatively complex design because said assembly tool additionally has to have elements, acting on the first latching elements, that interact with the first latching elements and are movable perpendicular to the joining direction.

DISCLOSURE OF THE INVENTION

The wiper motor according to the invention, having the features of claim 1, particularly has the advantage that a mould required for producing the gearbox cover can be constructed in a particularly simple manner, or from a particularly small number of parts, respectively. This particularly minimizes the investment costs of the tool and thus also the production costs of the gearbox cover.

The invention is based on the concept of configuring the first latching elements on the gearbox cover in such a manner that said latching elements in a direction that, relative to the main body of the gearbox housing, runs perpendicular to the joining direction of the gearbox cover are configured so as to be free of undercuts, i.e. without any undercuts. As a result, it is usually possible for the gearbox cover to be produced by means of only two moulds that are mutually adjustable in an axial manner. The use of a slide which is disposed so as to be able to be moved transversely thereto, as is necessary in the region of a first latching element in the prior art, is thus superfluous.

Advantageous refinements of the wiper motor according to the invention are set forth in the dependent claims.

In order for an elastic deformation of the first latching element and a configuration of the latching connection between the two latching elements to be enabled in an axial movement between the gearbox cover and the main body of the gearbox housing, it is particularly preferably provided that the second latching element in the cross section is configured so to be wedge-shaped and has a bearing face which runs perpendicular to the joining direction, the depth of said bearing face increasing when viewed in the joining direction. The bearing face during the assembly process here interacts with the blocking portion on the first latching element so that the blocking portion by the bearing face is impinged with a force which in a direction running substantially perpendicular to the joining direction causes an elastic deformation of the tongue-type first latching element.

In terms of the constructive design embodiment of the first latching element it is moreover preferably provided that the tongue-type portion of the first latching element has two webs which are disposed so as to be mutually parallel and run so as to be aligned with the joining direction and in each case preferably have a constant rectangular cross section and on the side that faces away from the connection point on the housing cover are connected to one another by the blocking portion, wherein the webs conjointly with the blocking portion delimit or configure, respectively, a rectangular clearance on the tongue-type portion.

In one particular preferred design embodiment of the first latching element it is provided that the blocking portion on the side that faces away from the main body has a ramp, the depth of the latter increasing when viewed in the joining direction. This, in particular in conjunction with an assembly tool, during the assembly of the gearbox cover on the main body of the gearbox housing permits a force running perpendicular to the joining direction to be applied to the first latching element in order to ensure the configuration of the latching connection between the gearbox cover and the main body of the gearbox housing.

In a refinement of the last proposal it is provided that the ramp transitions to the blocking face, wherein the blocking face is configured so as to be planar and runs perpendicular to the joining direction.

As has already been explained at the outset, in terms of the gearbox cover being able to be economically produced it is particularly advantageous for said gearbox cover to be composed of plastics material and as an injection-moulded component.

The invention furthermore also comprises a method for assembling a wiper motor which is configured in the manner described above, wherein the method comprises at least the following method steps: Firstly, positioning of the gearbox cover in relation to the main body takes place in such a manner that the first and the second latching elements, when viewed in the joining direction, are mutually aligned. Subsequently, moving the gearbox cover and the main body relative to one another takes place in the joining direction until the latching connections between the gearbox cover and the main body are configured. Lastly, exerting in the direction of the main body a joining force aligned perpendicular to the joining direction on the first latching elements during the joining procedure or upon achieving an axial terminal position of the gearbox cover in relation to the main body takes place.

In a refinement of the method described to this extent it is provided that the joining force is exerted on the first latching elements in the region of the ramp.

It can in particular be provided here that the joining force is applied by an assembly tool which is configured so as to be movable parallel to the joining direction.

Finally, the invention also comprises an assembly too for applying the joining force.

Further advantages, features and details of the invention are derived from the following description of preferred embodiments of the invention as well as by means of the drawings.

EMBODIMENTS OF THE INVENTION

Figure 1:
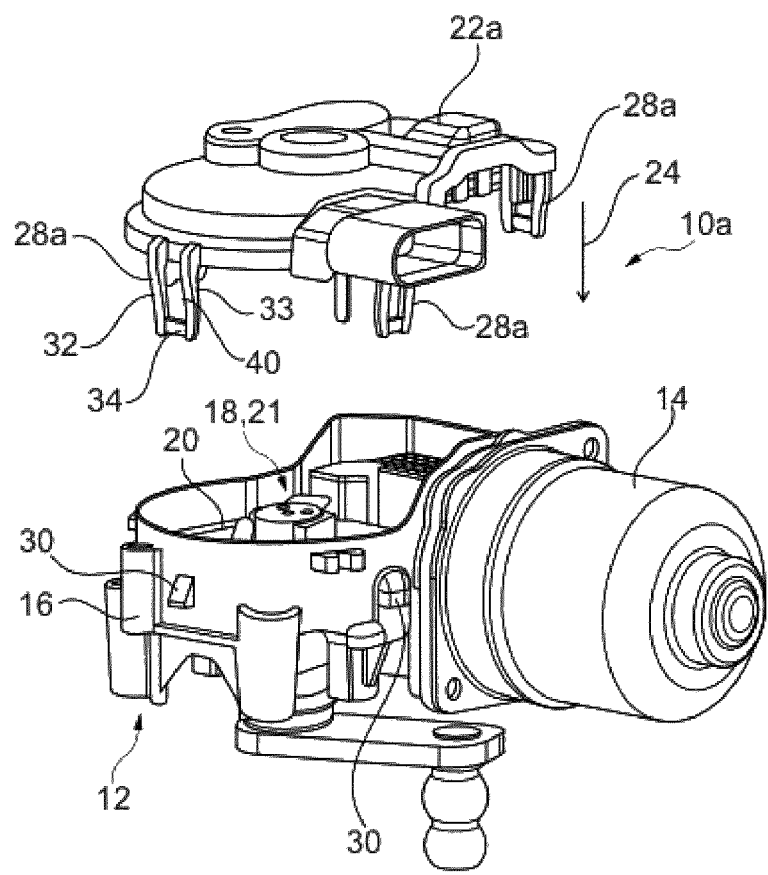
FIG. 1 in a perspective illustration shows a wiper motor during a joining procedure of a gearbox cover on a main body of a gearbox housing according to the prior art.

Identical elements or elements having an identical function are denoted by the same reference numbers in the figures.

An assembling process in the case of a wiper motor 10a according to the prior art will first be discussed on the basis of FIGS. 1 and 2. The wiper motor 10a comprises a gearbox housing 12a to which a motor housing 14 in which an electric motor is disposed is flange-fitted. The gearbox housing 12 has at least one pot-shaped main body 16 for configuring a receptacle space 18 for a gearbox 20. An opening 21 of the receptacle space 18, or of the main body 16, respectively, is able to be closed by means of a gearbox cover 22a that is composed of plastics material and produced by the injection-moulding method. To this end, the gearbox cover 22a in the assembling or joining direction 24, which is identified by the arrow in FIG. 1 and runs perpendicular the plane of the gearbox cover 22a, is moved relative to the main body 16 of the gearbox housing 12, for example.

Figure 2:
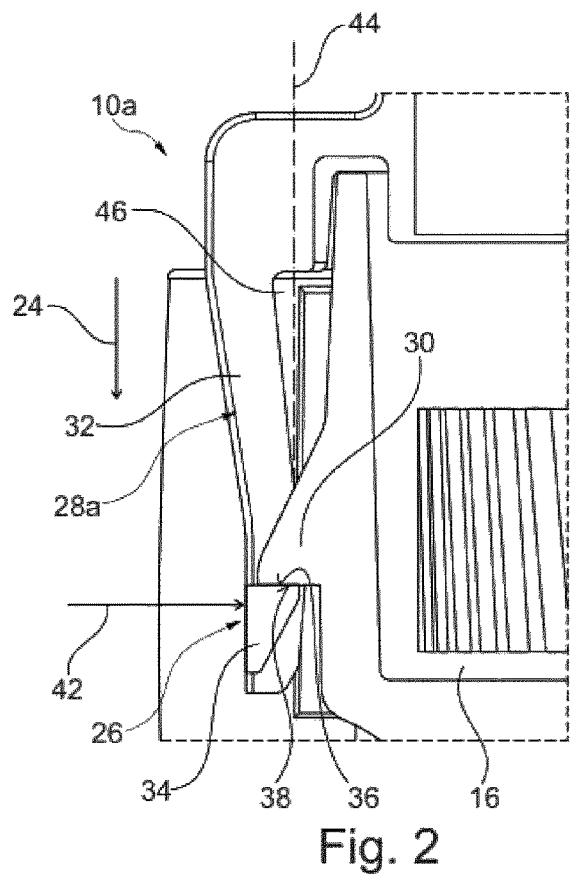
FIG. 2 in a sectional illustration shows a detail of the wiper motor according to FIG. 1 in an assembled gearbox cover.

In the joined state of the gearbox housing 12, in which the gearbox cover 22a has reached the axial terminal position thereof in relation to the main body 16, in an exemplary manner a plurality of, for example three or four, latching connections 26 are configured between the gearbox cover 22a and the main body 26, one of said latching connections 26 being visible in FIG. 2. The latching connections 26 are formed by tongue-type first latching elements 28a on the gearbox cover 22a and by second latching elements 30 that are configured on the main body 16 and interact with the first latching elements 28a. The first latching elements 28a have two webs 32, 33 which run so as to be mutually parallel and are configured so as to be integral to, or monolithic with, the gearbox cover 22a, wherein the two webs 32, 33 on the side that faces away from the gearbox cover 22a are connected to one another by way of a web-shaped, transversely running blocking portion 34. The blocking portion 34 has a blocking face 36 which runs perpendicular to the joining direction 24 and in the joined state of the gearbox housing 12 interacts with a mating face 38 configured on the second latching element 30.

The second latching element 30 in the cross section is configured so as to be wedge-shaped and has a width which in the joined state permits that the second latching element 30 is received within a rectangular clearance 40 that on the first latching element 28a is delimited by the two webs 32, 33.

In the joining procedure of the gearbox housing 12, the gearbox cover 22a is moved in relation to the main body 16, for example. The blocking portions 34 here come into contact with the second latching elements 30 (configured so as to be wedge-shaped), wherein the first latching elements 28a are moved away from the main body 16 in that the first latching elements 28a are elastically deformed. Having crossed the second latching elements 30, the blocking portion 34 snaps back in the direction of the main body 16 such that the latching connections 26 are configured in the axial terminal position of the gearbox cover 22a in relation to the main body 16. In order to ensure that the latching connections 26 have actually been configured, i.e. that the blocking faces 36 of the first latching elements 28a interact with the mating faces 38 on the second latching elements 30, a force running in the direction of the arrow 42 is subsequently exerted on the first latching elements 28a by means of an assembly tool not illustrated. The direction of the arrow 42 here runs perpendicular to the joining direction 24.

As can be seen in particular by means of the illustration of FIG. 2, the two webs 32, 33 of the first latching element 28a run so as to be slightly oblique, i.e. not parallel, to the joining direction 24. As a result, the first latching element 28a in the region of the webs 32, 33 on the side that faces the main body 16, in terms of a plane 44 running parallel to the joining direction 24, has an undercut 46.

Figure 3:
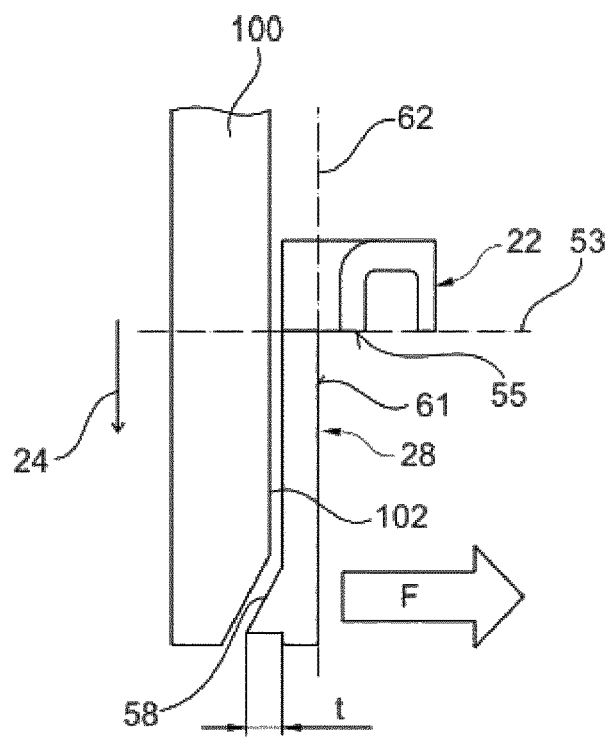
FIG. 3 in a longitudinal section shows the region of the latching element on a gearbox cover according to the invention.
Figure 4:
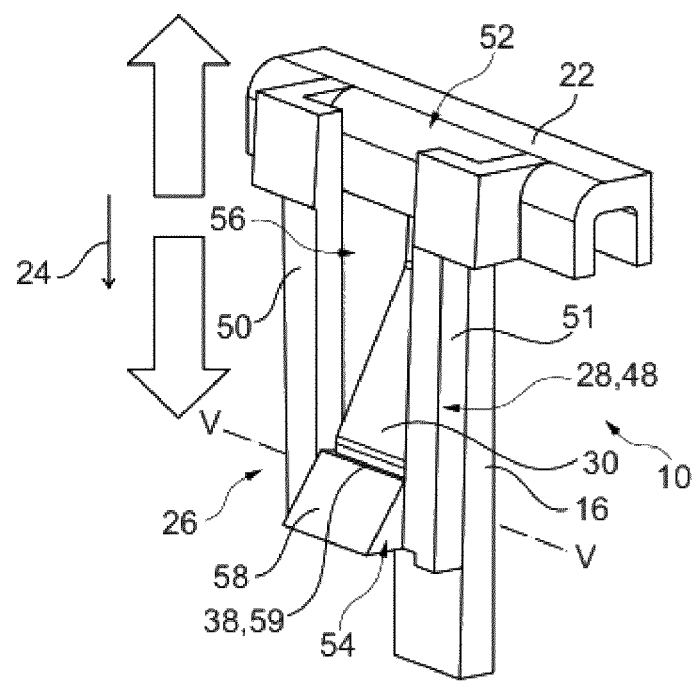
FIG. 4 shows a perspective illustration of a gearbox cover which is assembled on a gearbox housing and has a latching element according to FIG. 3.
Figure 5:
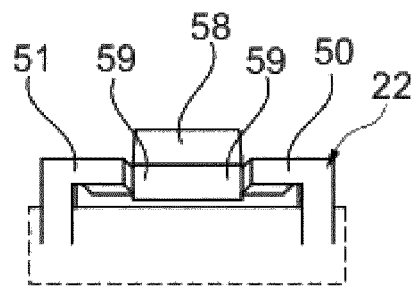
FIG. 5 shows a section in the plane V-V of FIG. 4.

Illustrated in FIGS. 3 to 5 is a gearbox cover according 22 according to the invention for a wiper motor 10 according to the invention, said gearbox cover 22 having been modified in comparison to FIGS. 1 and 2. The gearbox cover 22 in comparison to the gearbox cover 22a is distinguished by modified first latching elements 28. The first latching elements 28 have in each case a tongue-type portion 48 which has two webs 50, 51 that are disposed so as to be mutually parallel and run so as to be aligned with, or parallel to, respectively, the joining direction 24 and each have a preferably constant rectangular cross section. Furthermore, the two webs 50, 51 of the first latching elements 28 on the side that faces away from a connection point 52 to the gearbox cover 22 are connected to one another by a transversely running blocking portion 54. The webs 50, 51, conjointly with the blocking portion 54 and the connection point 52, delimit a rectangular clearance 56. The blocking portion 51 on the side that faces away from the main body 16 of the gearbox housing 12 has a ramp 58 which protrudes beyond the plane of the two webs 50, 51 and of which the depth t increases in the joining direction 24, i.e. in the direction towards the main body 16. The ramp 58 transitions to a blocking face 59, wherein the blocking face 59 is configured so as to be planar and runs perpendicular to the joining direction 24.

It is additionally explained that the gearbox cover 22 has a separation plane 53 (FIG. 3) which runs parallel to the plane of the gearbox cover 22, in particular parallel to a lower edge 55 of the gearbox cover 22 that closes the opening 21. The separation plane 53 runs perpendicular to the joining direction 24 and perpendicular to the extent of the tongue-type portions 48 of the latching elements 28. Mould parts, not illustrated, for producing the gearbox cover 22 by the injection-moulding method contact one another in the region of the separation plane 53 and are disposed so as to be mutually movable perpendicular to the separation plane 53.

The second latching element 30 according to the prior art is configured so as to be wedge-shaped in such a manner that the depth of said second latching element 30 increases when viewed in the joining direction 24, and wherein the second latching element 30 has a mating face 38 that interacts with the blocking face 59.

As can be particularly clearly seen by means of FIG. 3, a first latching element 28 configured in such a manner, in terms of a plane 62 that in the region of the webs 50, 51 is disposed parallel to the joining direction 24 on the main body 16, does not have any undercut, or is configured so as to be free of undercuts, respectively. This is highlighted by the fact that the entire rear side 61 of the webs 50, 51, or of the first latching element 28, respectively, runs parallel to the plane 62, or so as to be aligned with the latter, respectively.

It can furthermore be particularly clearly seen by means of FIGS. 3 and 4 that the blocking portion 54 on the side that faces away from the main body 16 runs outside the webs 50, 51. This, in conjunction with an assembly tool 100 which can be seen in FIG. 3 and is configured so as to be movable parallel to the joining direction 24, upon reaching the axial terminal position of the gearbox cover 22, or of the first latching elements 28, respectively, in relation to the second latching elements 30 of the main body 16, enables a force F acting substantially perpendicular to the joining direction 24 to be exerted on the first latching element 28 by way of a bearing contact of a bearing face 102 of the assembly tool 100, on the blocking face 59, so as to ensure that the blocking portion 54 of the first latching element 28 has established an operative connection with the mating face 38 on the second latching element 30.

The wiper motor 10a described to this extent can be altered or modified in a wide variety of ways without departing from the concept of the invention. It is pointed out in particular that the assembling or joining direction 24, respectively, relates to the case in which the gearbox cover 22, 22a is moved in the direction towards the main body 16 of the gearbox housing 12. Of course, it is also conceivable that the main body 16 instead is moved in the direction towards the gearbox cover 22, 22a, or that both mentioned parts are simultaneously converged.

LIST OF REFERENCE SIGNS

10 Wiper motor
10a Wiper motor
12 Gearbox housing
14 Motor housing
16 Main body
18 Receptacle space
20 Gearbox
21 Opening
22 Gearbox cover
22a Gearbox cover
24 Joining direction
26 Latching connection
28a First latching element
30 Second latching element
32 Web
33 Web
34 Blocking portion
36 Blocking face
38 Mating face
40 Clearance
42 Arrow
44 Plane
46 Undercut
48 Portion
50 Web
51 Web
52 Connection point
53 Separation plane
54 Blocking portion
55 Lower edge
56 Clearance
58 Ramp
59 Blocking face
61 Rear side
62 Plane
100 Assembly tool
102 bearing face
K Force
t Depth

The invention claimed is:

1. A wiper motor having a gearbox housing, the gearbox housing comprising:
a pot-shaped main body for configuring a receptacle space for a gearbox; wherein an opening of the pot-shaped main body is configured to close with a gearbox cover, wherein a plurality of latching connections are configured to act in a joining direction between the pot-shaped main body and the gearbox cover;
said latching connections with a first latching element that is elastically deformable on the gearbox cover and a second latching element that is rigid on the main body, the second latching element configured to interact with the first latching element in a form-fitting manner;
wherein the first latching element protrudes from a connection point in the joining direction by way of a tongue-type portion on the gearbox cover;
the tongue-type portion portion being elastically deformable in a direction running perpendicular to the joining direction;
wherein the second latching element in the joined state of the gearbox cover by way of a blocking portion that on the first latching element is disposed in a region of the tongue-type portion interacts with a blocking face on the first latching element;
wherein the blocking portion has a ramp on a side that faces away from the main body, the depth of the second latching element increasing when viewed in the joining direction;
wherein the ramp transitions to the blocking face; and
wherein the tongue-type portion of the first latching element is configured so as to be free of any undercut either in a direction running perpendicular to the joining direction, or in a direction parallel to the extent of the tongue-type portion.

2. The wiper motor according to claim 1, wherein the tongue-type portion of the first latching element has two webs, which are disposed in parallel and run so as to be aligned with the joining direction, where said webs have a constant rectangular cross section and are connected to one another by the blocking portion on a side that faces away from the connection point on the gearbox cover;
   wherein the webs are configured to connect jointly with the blocking portion and with a rectangular clearance on the tongue-type portion.

3. The wiper motor according to claim 1, wherein the blocking face is configured to be planar and runs perpendicular to the joining direction.

4. The wiper motor according to claim 1, the gearbox cover is composed of plastics material and is configured as an injection-moulded component.

5. The wiper motor according to claim 1, wherein the second latching element in the cross section is configured so as to be wedge-shaped and has a ramp which runs perpendicular to the joining direction, the depth of said ramp increasing when viewed in the joining direction.

6. A method for assembling a wiper motor-which-is configured according to claim 1, the method comprising:
   positioning the gearbox cover in relation to the main body in such a manner that the first and the second latching elements, when viewed in the joining direction, are mutually aligned;
   moving the gearbox cover and the main body relative to one another in the joining direction until the latching connections between the gearbox cover and the main body are configured; and
   exerting in the direction of the main body a force that is aligned perpendicular to the joining direction on the first latching elements during the joining procedure or upon achieving an axial terminal position of the gearbox cover in relation to the main body.

7. The method according to claim 6, wherein the force is exerted on the first latching elements in the region of a ramp.

8. The method according to claim 6, wherein the force is applied by an assembly tool which is configured so as to be movable parallel to the joining direction.

9. The method according to claim 6, where an assembly tool is used for applying the force.

* * * * *